US011865857B2

(12) United States Patent
Harris et al.

(10) Patent No.: US 11,865,857 B2
(45) Date of Patent: Jan. 9, 2024

(54) HETEROGENEOUS FIBER FLUID RESERVOIRS

(71) Applicant: Porex Technologies Corporation, Colonial Heights, VA (US)

(72) Inventors: David Bradley Harris, Midlothian, VA (US); Kevin Sporrer, Sharpsburg, GA (US); Janie Wierzbicki, Richmond, VA (US); Ronald Eugene Billups, Mechanicsville, VA (US); Yelena Rogova, Richmond, VA (US); Thomas E. Harris, Colonial Heights, VA (US); Qiang Zhou, Moseley, VA (US); Timothy Allen Martin, Newnan, GA (US); Xingguo Li, Peachtree City, GA (US); Guoqiang Mao, Peachtree City, GA (US)

(73) Assignee: Porex Technologies Corporation, Colonial Heights, VA (US)

( * ) Notice: Subject to any disclaimer, the term of this patent is extended or adjusted under 35 U.S.C. 154(b) by 128 days.

(21) Appl. No.: 17/277,985

(22) PCT Filed: Sep. 20, 2019

(86) PCT No.: PCT/US2019/052216
§ 371 (c)(1),
(2) Date: Mar. 19, 2021

(87) PCT Pub. No.: WO2020/061492
PCT Pub. Date: Mar. 26, 2020

(65) Prior Publication Data

US 2021/0370706 A1 Dec. 2, 2021

Related U.S. Application Data

(60) Provisional application No. 62/734,020, filed on Sep. 20, 2018.

(51) Int. Cl.
*B43K 8/03* (2006.01)
*B43K 8/06* (2006.01)

(52) U.S. Cl.
CPC . *B43K 8/03* (2013.01); *B43K 8/06* (2013.01)

(58) Field of Classification Search
CPC ... B43K 8/03; B43K 8/06; B43K 8/08; B43K 8/12
See application file for complete search history.

(56) References Cited

U.S. PATENT DOCUMENTS 3,133,526 A 5/1964 Sears
4,590,032 A 5/1986 Phillips
(Continued)

FOREIGN PATENT DOCUMENTS

CN 1652948 A 8/2005
CN 1845828 A 10/2006
(Continued)

OTHER PUBLICATIONS

International Search Report and Written Opinion for PCT/US2019/052216 dated Dec. 4, 2019.

*Primary Examiner* — David P Angwin
*Assistant Examiner* — Bradley S Oliver
(74) *Attorney, Agent, or Firm* — DLA Piper LLP (US)

(57) ABSTRACT

The instant disclosure is directed to a heterogeneous fiber fluid reservoir for holding and delivering fluid. A reservoir may comprise a rod having a core component and a surrounding component. Each of the core component and the surrounding component may comprise fibers. The core component may have a first property, and the surrounding component may have a second property different from the first property, or the core component and the surrounding component may each have a different value or range of values for the same property. Alternatively, a reservoir may
(Continued)

comprise a rod that includes fibers and has a cross-sectional diameter. At least one property of the rod may vary in value along the cross-sectional diameter of the rod. The property may include, for example, fiber bulk density, fiber diameter, fiber material, fiber morphology, fiber surface tension, capillary force, fluid absorption capacity, color, or combinations thereof.

17 Claims, 6 Drawing Sheets

(56) References Cited

U.S. PATENT DOCUMENTS

| | | | | |
|---|---|---|---|---|
| 4,639,397 | A | 1/1987 | Sato et al. | |
| 4,729,808 | A | 3/1988 | Berger | |
| 4,822,193 | A | 4/1989 | Berger | |
| 4,996,107 | A | 2/1991 | Raynolds et al. | |
| 5,620,641 | A | 4/1997 | Berger | |
| 6,322,268 | B1 * | 11/2001 | Kaufmann | B43K 8/02 401/199 |
| 6,814,911 | B2 * | 11/2004 | Ward | A24D 3/065 264/109 |
| 7,364,614 | B2 * | 4/2008 | Kwan | B43K 8/06 106/31.86 |
| 2004/0041285 | A1 * | 3/2004 | Xiang | F23D 3/08 261/99 |
| 2006/0163152 | A1 * | 7/2006 | Ward | B01D 39/163 210/505 |

FOREIGN PATENT DOCUMENTS

| | | | |
|---|---|---|---|
| DE | 3642037 | A1 * | 6/1988 |
| EP | 0351182 | A2 | 1/1990 |
| EP | 1093936 | A1 | 4/2001 |
| EP | 1433613 | B1 | 7/2009 |
| JP | S46003613 | A | 11/1971 |
| JP | S53104318 | A | 9/1978 |
| JP | H10226191 | A | 8/1998 |
| JP | H11507994 | A | 7/1999 |
| JP | 2004042262 | A | 2/2004 |
| JP | 2018122566 | A | 8/2018 |
| KR | 200186214 | Y1 | 6/2000 |
| WO | 2015046861 | A1 | 4/2015 |
| WO | 2020061492 | A1 | 3/2020 |

* cited by examiner

HETEROGENEOUS FIBER FLUID RESERVOIRS

CROSS-REFERENCE TO RELATED APPLICATIONS

This application is a U.S. National Stage filing under 35 U.S.C. § 371 of International PCT Application No. PCT/US2019/052216, filed Sep. 20, 2019, which claims priority to and benefit of U.S. Provisional Application Ser. No. 62/734,020, filed Sep. 20, 2018, entitled "Heterogeneous Fiber Fluid Reservoirs," each of which is incorporated herein by reference in its entirety.

TECHNICAL FIELD

The present disclosure is related to a heterogeneous fiber fluid reservoir for holding and delivering fluid through capillary action.

BACKGROUND

Fiber fluid reservoirs, such as ink reservoirs, have been widely used in writing instruments, including permanent markers, highlighter markers, and dry-erase markers. Traditional ink reservoirs employ homogeneous constructs, meaning that the fibers in traditional reservoirs are uniformly distributed. No significant difference exists in the fiber bulk density, fiber diameter, or capillary force along the length or cross-section of a traditional homogeneous ink reservoir; this homogeneity results in the reservoir having uniform fluid absorption and capillary properties throughout. U.S. Pat. Nos. 4,729,808; 4,822,193; 4,996,107; 4,639,397; and 4,590,032 each describe traditional ink reservoirs. Traditional ink reservoirs use a significant amount of ink, leading to increased cost and decreased sustainability. Furthermore, traditional ink reservoirs demonstrate a gradual drop-off toward the end of a writing instrument's useful life, thereby making it difficult for consumers to identify when the writing instrument should be replaced. Therefore, there exists a need for improved ink reservoir structures capable of providing an improved writing experience, a decrease in the amount of ink required, and a steeper drop-off for better end-of-life indication.

SUMMARY

The instant disclosure is directed to a heterogeneous fiber fluid reservoir for holding and delivering fluid. In an embodiment, a reservoir may comprise a rod having a core component and a surrounding component. Each of the core component and the surrounding component may comprise fibers. In some embodiments, the core component may have a first property, and the surrounding component may have a second property different from the first property. In other embodiments, the core component and the surrounding component may each have a different value or range of values for the same property. For example, the core component may have a high fiber bulk density, while the surrounding component may have a lower fiber bulk density than the core component.

In one embodiment, a reservoir may comprise a rod that includes fibers. The rod may have a cross-sectional diameter, and at least one property of the rod may vary in value along the cross-sectional diameter of the rod. In some embodiments, the at least one property of the rod may be selected from fiber bulk density, fiber diameter, fiber material, fiber morphology, fiber surface tension, capillary force, fluid absorption capacity, color, or combinations thereof.

DETAILED DESCRIPTION

This disclosure is not limited to the particular systems, devices, and methods described, as these may vary. The terminology used in the description is for the purpose of describing the particular versions or embodiments only, and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to a "fiber" is a reference to one or more fibers and equivalents thereof known to those skilled in the art, and so forth.

As used herein, the term "fluid" includes a substance that has no fixed shape and yields to external pressure. For example, fluids can include gases and liquids. As used herein, the terms "fluid" and "liquid" may be used interchangeably and, for the purposes of this disclosure, include a substance having a flow directed by a particular reservoir including, for example, a heterogeneous fiber fluid reservoir as described herein. Examples of fluids as described herein can include writing instrument inks, inkjet inks, cosmetic compositions, foundations, perfumes, sunscreens, oils, gels, liquid therapeutic agents, and other similar liquids and fluids.

In certain implementations, the present disclosure is directed to a heterogeneous fiber fluid reservoir. As used herein, a "heterogeneous" fiber fluid reservoir has different, distinguishable regions combined into a single reservoir during manufacturing, with the distinguishable regions having with different properties. In certain implementations, the properties may vary gradually along one or more dimensions of the reservoir. In other implementations, the properties may vary abruptly along one or more dimensions of the reservoir. In some implementations, a variation in the one or more properties along the one or more dimensions of the reservoir is a controlled variation.

Heterogeneous Fiber Fluid Reservoirs

As discussed herein, there exists a need for improved ink reservoir structures capable of providing an improved writing experience (including improved ink delivery against gravity), a decrease in the amount of ink required, and a steeper drop-off for better end-of-life indication. A heterogeneous fiber fluid reservoir may provide such improvements.

Figure 1:
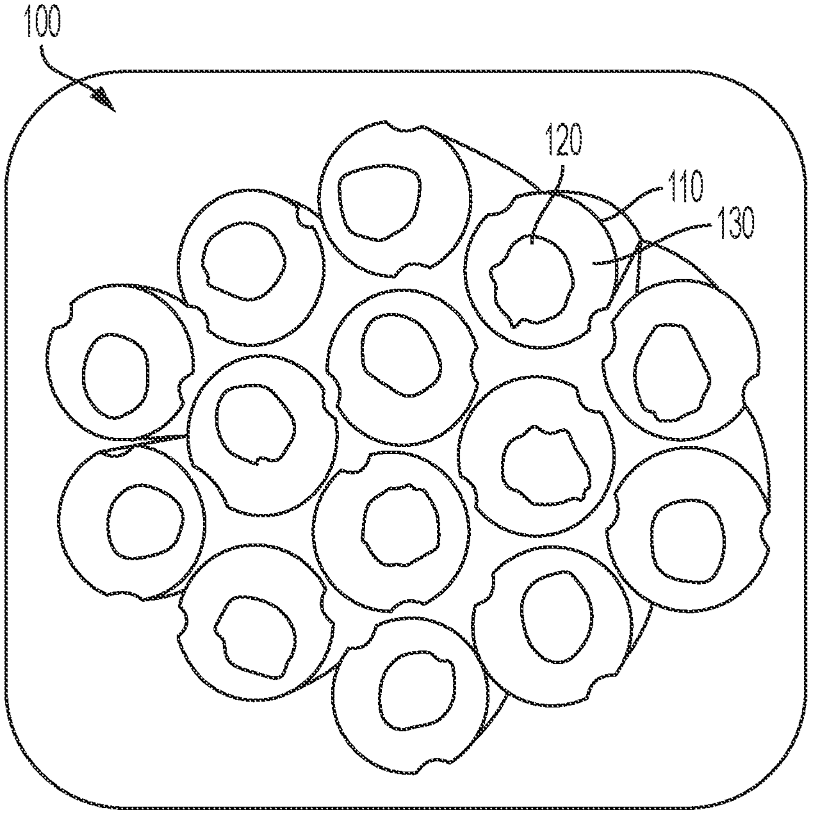
FIG. 1 illustrates a top view of an embodiment of a collection of fourteen rods, each rod having an ink-bearing core region and a surrounding region, in accordance with the present disclosure.

In some embodiments, a reservoir may comprise one or more rods. In an embodiment, a rod may be referred to as a "rod reservoir." In certain embodiments, each rod may comprise a cylinder, and may have a substantially circular cross-sectional shape. In some embodiments, the rod may have a cross-sectional shape selected from the group consisting of circular, elliptic, tri-lobe, square, rectangular, or a combination thereof. In one embodiment, the reservoir may be configured to be contained within a writing instrument. For example, FIG. 1 illustrates an embodiment of a collection 100 of fourteen reservoirs, each reservoir comprising a rod 110. In an embodiment, each rod may comprise one or more fibers. In one embodiment, each rod may have a first open end and, optionally, a second open end. In some embodiments, the shaft of the rod (that is, the length between the open end(s)) may be encased in a fluid-impermeable material. In certain embodiments, the fluid-impermeable material may comprise a liquid-impermeable polymer film.

In certain embodiments, a rod may comprise a core component and a surrounding component, and each of the core component and the surrounding component may comprise fibers. FIG. 1 illustrates an embodiment of a collection 100 having multiple rods 110, each rod comprising a core component 120 and a surrounding component 130. The core component 120 of each rod 110 has a higher capillary force than the surrounding component 130 of each rod. The core components 120 in FIG. 1 are saturated with ink, as an example, while the surrounding components 130 are not, illustrating a variation or heterogeneity in wicking properties between the core component and the surrounding component.

Figure 2:
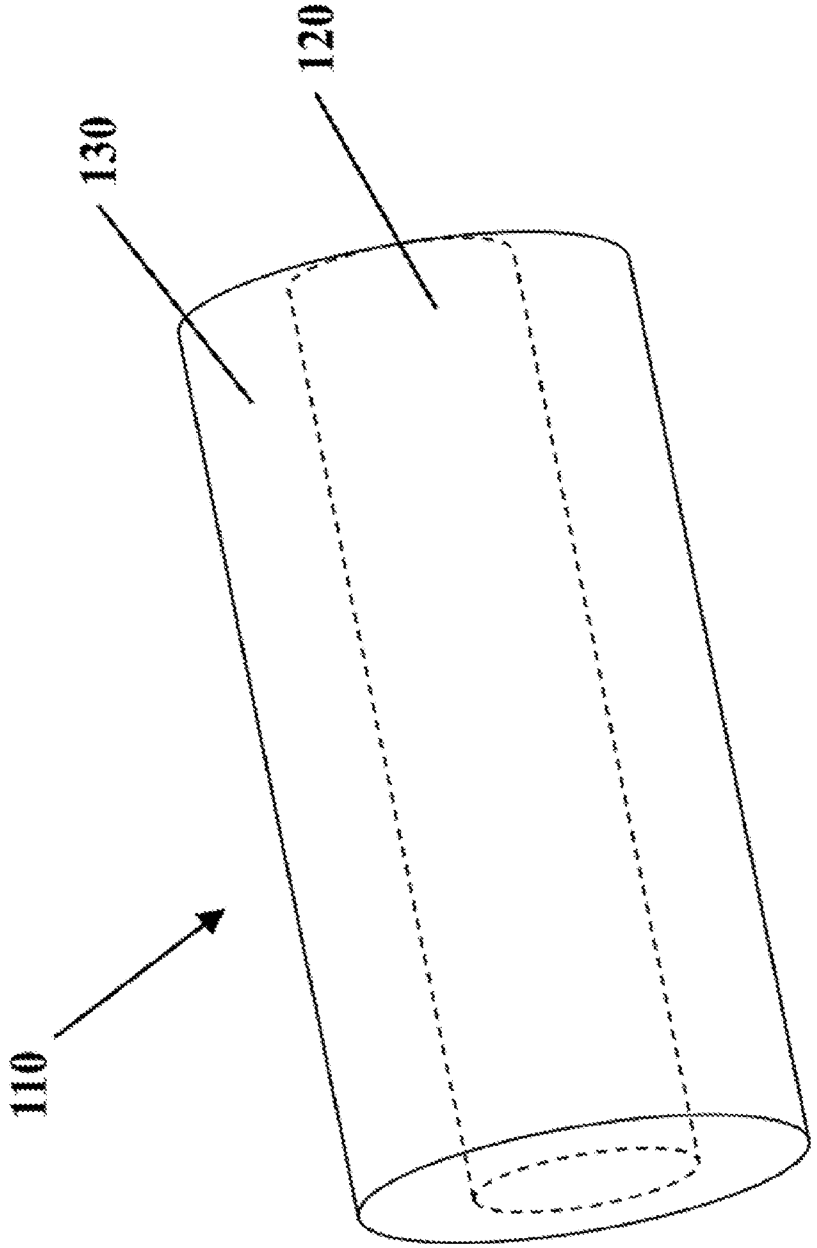
FIG. 2 illustrates a schematic representation of an embodiment of a rod having a core component and a surrounding component in accordance with the present disclosure.

Specifically, FIG. 1 is a top view of the collection 100 of rods 110, taken after the bottom of the collection of rods was dipped into a black ink solution. FIG. 1 shows that within each rod, the distribution of the black ink is heterogeneous. The core component 120 has a higher capillary force, resulting in the delivery of the ink from the bottom of the core component to the top of the core component, against gravity, faster than the delivery of the ink from the bottom of the surrounding component 130 to the top of the surrounding component. Similarly, FIG. 2 illustrates a schematic representation of an embodiment of a rod 110 having a core component 120 and a surrounding component 130.

In an embodiment, the core component 120 of the rod 110 and the surrounding component 130 of the rod may each have one or more properties. In some embodiments, the core component 120 of the rod 110 may have a first property, and the surrounding component 130 of the rod may have a second property. In some embodiments, the first property may be different from the second property, while in other embodiments, the first property and the second property may be the same property but may differ in value. In other embodiments, the core component 120 and the surrounding component 130 may each have a different value or range of values for the same property. By way of illustration, for example, the core component 120 may have a high fiber bulk density, while the surrounding component 130 may have a lower fiber bulk density than the core component. In certain embodiments, the one or more properties, and/or the first property and the second property, may be selected from the group consisting of fiber bulk density, fiber diameter, fiber material, fiber morphology, fiber surface tension, capillary force, fluid absorption capacity, color, and combinations thereof.

In an embodiment, any of the one or more properties can vary across a range of values within the rod 110. In certain implementations, the properties may vary gradually along one or more dimensions of the reservoir, while in other implementations, the properties may change abruptly along one or more dimensions of the reservoir. In some implementations, the variation in the one or more properties along the one or more dimensions of the reservoir is a controlled variation.

In some embodiments, the fiber bulk density (i.e., the matrix density formed by individual fibers) may range from a value of about 0.01 g/cm$^3$ to about 0.4 g/cm$^3$. The fiber bulk density in any component of the rod may be, for example, about 0.01 g/cm$^3$, about 0.02 g/cm$^3$, about 0.03 g/cm$^3$, about 0.04 g/cm$^3$, about 0.05 g/cm$^3$, about 0.06 g/cm$^3$, about 0.07 g/cm$^3$, about 0.08 g/cm$^3$, about 0.09 g/cm$^3$, about 0.10 g/cm$^3$, about 0.11 g/cm$^3$, about 0.12 g/cm$^3$, about 0.13 g/cm$^3$, about 0.14 g/cm$^3$, about 0.15 g/cm$^3$, about 0.16 g/cm$^3$, about 0.17 g/cm$^3$, about 0.18 g/cm$^3$, about 0.19 g/cm$^3$, about 0.2 g/cm$^3$, 0.21 g/cm$^3$, about 0.22 g/cm$^3$, about 0.23 g/cm$^3$, about 0.24 g/cm$^3$, about 0.25 g/cm$^3$, about 0.26 g/cm$^3$, about 0.27 g/cm$^3$, about 0.28 g/cm$^3$, about 0.29 g/cm$^3$, about 0.3 g/cm$^3$, 0.31 g/cm$^3$, about 0.32 g/cm$^3$, about 0.33 g/cm$^3$, about 0.34 g/cm$^3$, about 0.35 g/cm$^3$, about 0.36 g/cm$^3$, about 0.37 g/cm$^3$, about 0.38 g/cm$^3$, about 0.39 g/cm$^3$, about 0.4 g/cm$^3$, or any range between any two of these values, including endpoints.

In some embodiments, the fiber diameter (i.e., the diameter of an individual fiber filament) may range from a value of about 0.5 μm to about 50 μm. The fiber diameter in any component of the rod may be, for example, about 0.5 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, or any range between any two of these values, including endpoints.

In certain embodiments, the one or more properties may include the fiber material. The fiber material in either component 120, 130 of the rod 110 may be, for example, polyester, nylon, acrylic, cellulose, polyethylene, polypropylene, polyvinyl alcohol, or any combination or copolymer thereof.

In some embodiments, the fiber surface tension may range from a value of about 30 dyn/cm to about 70 dyn/cm. The fiber surface tension in either component 120, 130 of the rod 110 may be, for example, about 30 dyn/cm, about 35 dyn/cm, about 40 dyn/cm, about 45 dyn/cm, about 50 dyn/cm, about 55 dyn/cm, about 60 dyn/cm, about 65 dyn/cm, about 70 dyn/cm, or any range between any two of these values, including endpoints.

In certain embodiments, the first property of the core component 120 and the second property of the surrounding component 130 may vary or differ by a percentage. In some embodiments, the property may differ by about 5%, about 10%, about 20%, about 50%, about 100%, or over 100%, or any range between any two of these percentages, including endpoints.

In some embodiments, the fibers of the core component 120 and the surrounding component 130 may each independently have a form selected from a stable fiber, a continuous fiber filament, a single component fiber, a bicomponent fiber, a multi-component fiber, a fiber tow, a yarn, or combinations thereof. In other embodiments, the fibers of the core component 120 and the surrounding component 130 may each independently have a cross-sectional shape selected from a circle, a triangle, an ellipse, a peanut, a zig-zag, and combinations thereof.

In some embodiments, the rods 110 described herein may be configured to absorb and release a fluid by capillary action. In an embodiment, the absorption and release of the fluid may be configured to vary along a cross-sectional diameter of the rod 110. In some embodiments, the variation of the absorption and release of the fluid may be attributable to the variation of the one or more properties along the cross-sectional diameter of the rod 110. In certain embodiments, the rods 110 may be configured to provide an uneven, or heterogeneous, distribution of fluid within the reservoir. As discussed herein, the heterogeneous distribution of fluid within the reservoir may, in the case of a writing instrument, improve a user's writing experience, decrease the amount of ink required to provide that experience, improve ink efficiency, and provide a steeper drop-off for better end-of-life indication for the user. Without wishing to be bound by theory, when a fluid is released from one or more rods in a writing instrument, for example, only the fluid in the center of the rod typically transfers to the nib. With a traditional homogeneous rod, the fluid not held within the center of the rod may not be available for transfer to the nib, meaning that otherwise useful fluid may be left inside the writing instrument at the end of its life because that excess fluid is located outside the center of the rod. In contrast, the heterogeneous rods 110 described herein are arranged such that a fluid may move from the surrounding component 130 to the core component 120 by capillary action within the rod 110 (i.e., between the surrounding component 130 and the core component 120). Thus, the heterogeneous rods 110 described herein can release more of the fluid than their traditional homogenously distributed counterparts can, making the heterogeneous rods 110 more efficient and effective.

Figure 3:
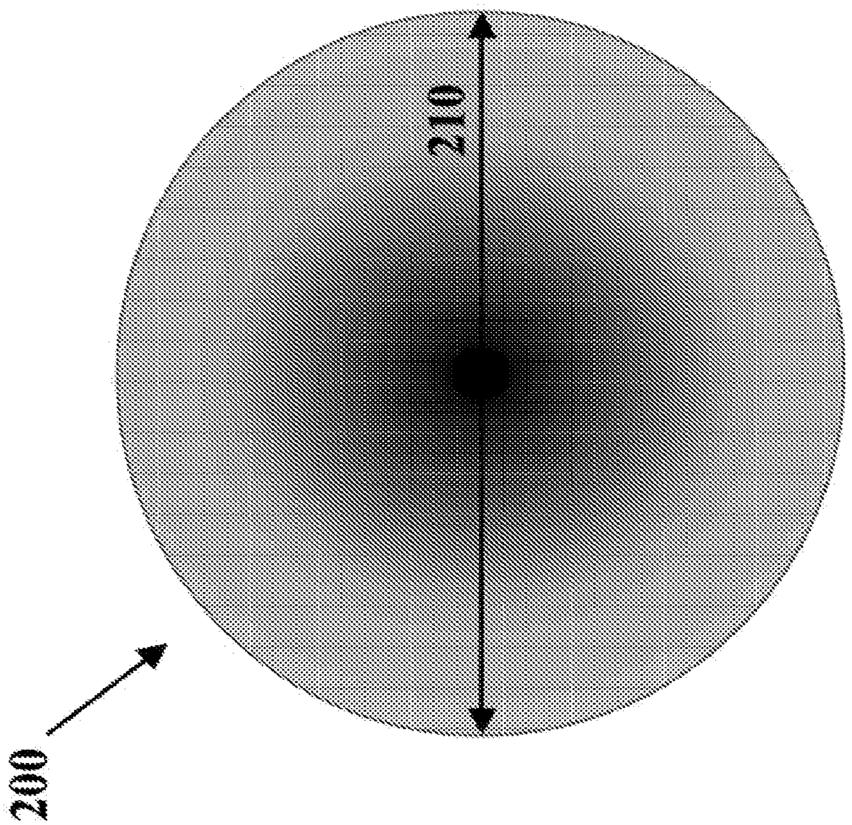
FIG. 3 illustrates a schematic representation of an embodiment of a rod comprising fibers in accordance with the present disclosure.

In certain embodiments, a reservoir may include a rod comprising fibers, as described herein. In some embodiments, the rod may have a cross-sectional diameter, and the at least one property discussed herein may vary in value along the cross-sectional diameter of the rod. FIG. 3, for example, illustrates a schematic representation of an embodiment of a rod 200 comprising fibers (not shown), wherein the rod 200 has a cross-sectional diameter 210 and wherein at least one property of the rod 200 varies in value (represented here by color/shade) across the cross-sectional diameter 210. In some embodiments, the at least one property may vary linearly along the cross-sectional diameter, while in other embodiments, the at least one property may vary non-linearly along the cross-sectional diameter. In some embodiments, the at least one property within a rod as described herein may vary sharply between the core component and the surrounding component, as shown in FIG. 1, while in other embodiments, the at least one property within a rod may vary gradually between the core component and the surrounding component, as shown in FIG. 3. The fibers of the core component, for example, may have a fiber bulk density that is between 150% and 200% higher than the fiber bulk density of the fibers of the surrounding component. Similarly, the fibers of the core component may have a fiber diameter that is between 30% and 50% smaller than the fibers of the surrounding component.

Figure 4:
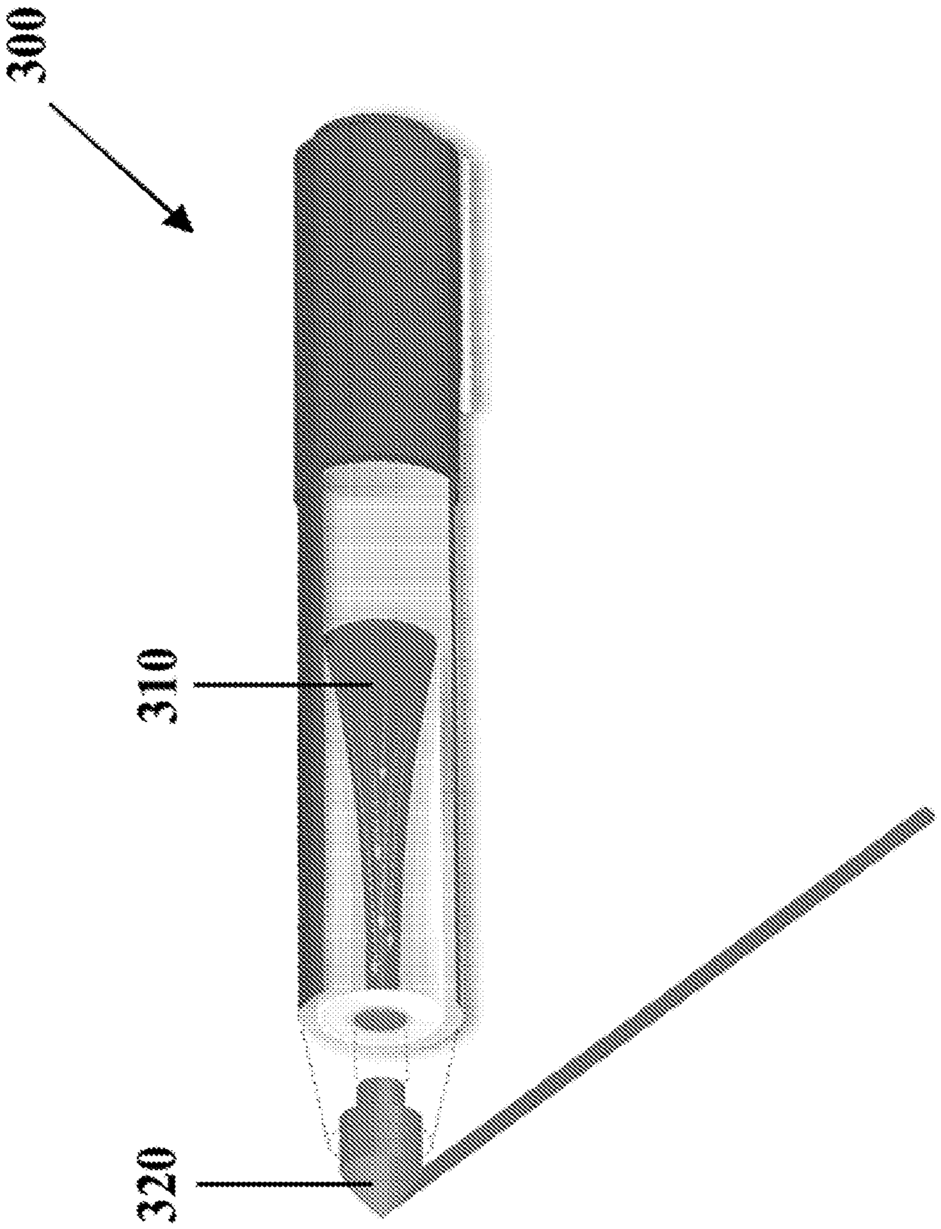
FIG. 4 illustrates a schematic representation of an embodiment of a writing instrument containing at least one reservoir and/or rod as described herein.

In an embodiment, a writing instrument may comprise at least one reservoir and/or rod as described herein, and a nib. A nib may include the pointed end of a writing instrument such as, for example, a fiber tip pen, a "felt tip" marker, a roller ball wick for a roller ball pen, and the like. In certain embodiments, the reservoir and/or rod of the writing instrument may be configured to hold and deliver an ink solution to the nib. In an embodiment, the reservoir and/or rod of the writing instrument may be configured as described herein, and may thereby provide a capillary draw capable of channeling the ink solution straight to the nib. This channeling of the ink solution directly to the nib may improve the writing instrument's ink efficiency, thereby improving a user's writing experience. FIG. 4, for example, illustrates a schematic representation of an embodiment of a writing instrument 300 containing at least one reservoir and/or rod 310 as described herein, with arrows showing the capillary draw of the ink solution from the reservoir and/or rod 310 to the nib 320.

EXAMPLES

Example 1

A reservoir containing rods as described herein was used to test ink wicking (i.e., capillary force) properties in an ink write-out test. The average ink laydown, writing distance, and total percentage of ink released were recorded. Table 1 below summarizes data indicating that the heterogeneous fiber fluid reservoirs described herein provide higher initial ink laydown and higher total ink release than the traditional homogeneous ink reservoir.

TABLE 1

| Sample ID/Ink Load | Average Laydown* | Average Distance** | Average of Yield Eff. |
|---|---|---|---|
| Homogeneous | | | |
| 2.0 g | 5.80 | 311 | 75% |
| Heterogeneous 1 | | | |
| 1.9 g | 7.02 | 288 | 80% |
| 2.0 g | 6.87 | 283 | 78% |
| Heterogeneous 2 | | | |
| 2.0 g | 8.52 | 260 | 80% |
| Heterogeneous 3 | | | |
| 2.0 g | 8.40 | 253 | 82% |
| Heterogeneous 4 | | | |
| 1.9 g | 6.17 | 306 | 78% |
| 2.0 g | 6.58 | 313 | 79% |

*Average laydown in mg/meter at 20 meters.
**Average distance in meters.

Figure 5:
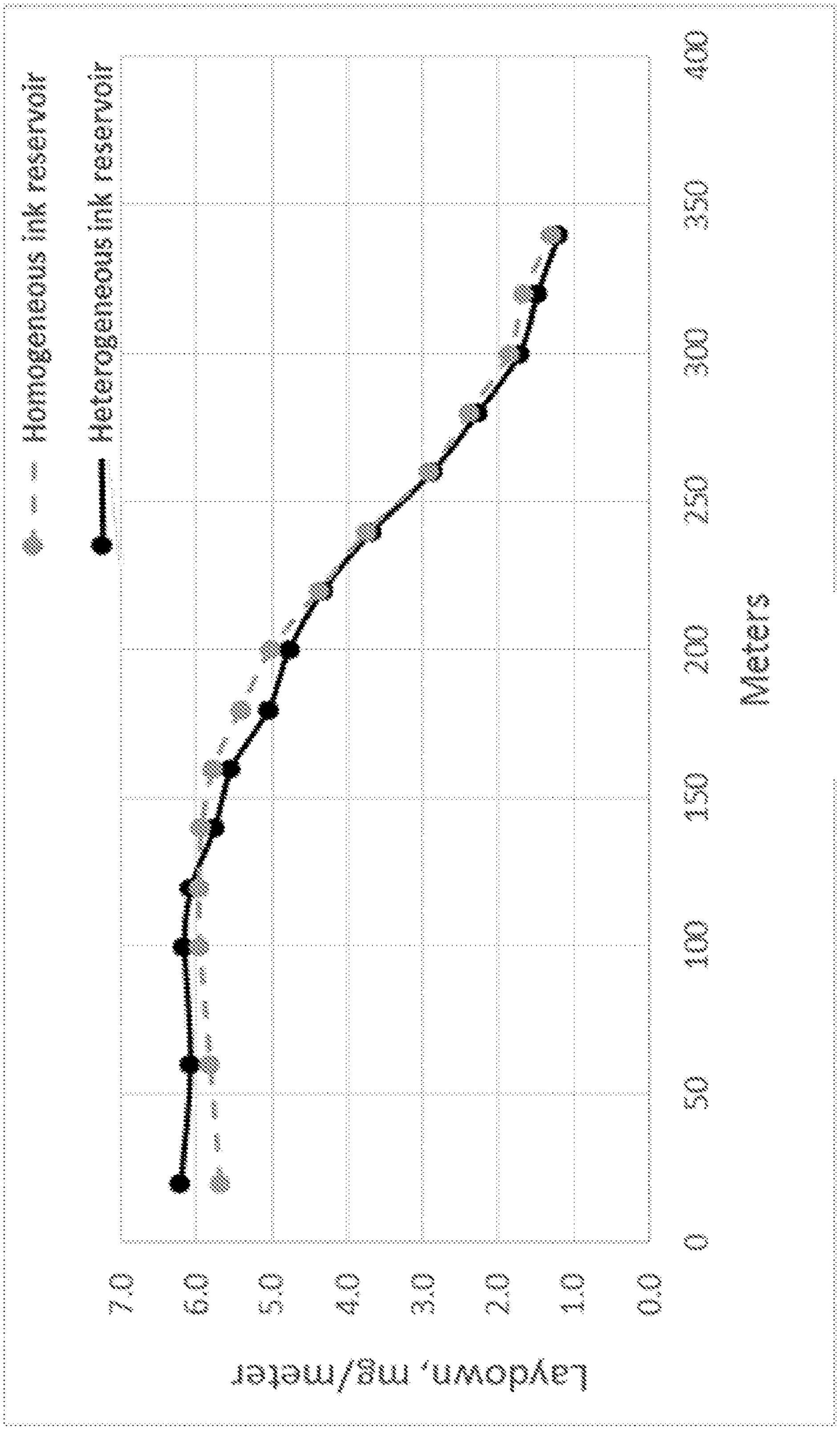
FIG. 5 is a graph comparing ink release profiles (with laydown in mg/meter as a function of meters) for (i) a traditional homogeneous ink reservoir at 2.0 grams ink loading; and (ii) a heterogeneous ink reservoir as described herein at 1.9 grams ink loading.

Furthermore, FIG. 5 is a graph comparing ink release profiles (with laydown in mg/meter as a function of meters) for (i) a traditional homogeneous ink reservoir at 2.0 grams ink loading (profile shown in gray with a dashed line); and (ii) a heterogeneous ink reservoir as described herein at 1.9 grams ink loading (i.e., about 5% less ink than the traditional homogeneous ink reservoir) (profile shown in black with a solid line). FIG. 5 indicates that the heterogeneous reservoir described herein with 1.9 g ink loading performed similarly to a traditional homogeneous ink reservoir with 2.0 g ink loading. In other words, the heterogeneous reservoir described herein required about 5% less ink to provide the improved results shown in Table 1 above.

Example 2

Ink release profiles were also determined for (i) a traditional homogeneous ink reservoir at 6.0 grams ink loading and (ii) a heterogeneous ink reservoir as described herein at 5.7 grams ink loading (i.e., about 5% less ink than the traditional homogeneous ink reservoir). Table 2 below summarizes data indicating that the heterogeneous fiber fluid reservoirs ("Heterogeneous" 1, 2, and 3) described herein provide higher total ink release than the traditional homogeneous ink reservoir ("Homogeneous (control)").

TABLE 2

| Sample ID | Total Ink Extracted | Ink Yield |
|---|---|---|
| Homogeneous (control) | | |
| Test 1 | 4.753 | 79% |
| Test 2 | 4.700 | 78% |
| Average | 4.726 | 79% |
| Std. dev. | 0.027 | 0% |
| Heterogeneous 1 | | |
| Test 1 | 5.046 | 84% |
| Test 2 | 4.848 | 81% |
| Average | 4.947 | 82% |
| Std. dev. | 0.099 | 2% |
| Heterogeneous 2 | | |
| Test 1 | 5.046 | 84% |
| Test 2 | 5.006 | 83% |
| Average | 5.026 | 84% |
| Std. dev. | 0.020 | 0% |
| Heterogeneous 3 | | |
| Test 1 | 5.127 | 85% |
| Test 2 | 5.088 | 85% |
| Average | 5.107 | 85% |
| Std. dev. | 0.020 | 0% |

Figure 6:
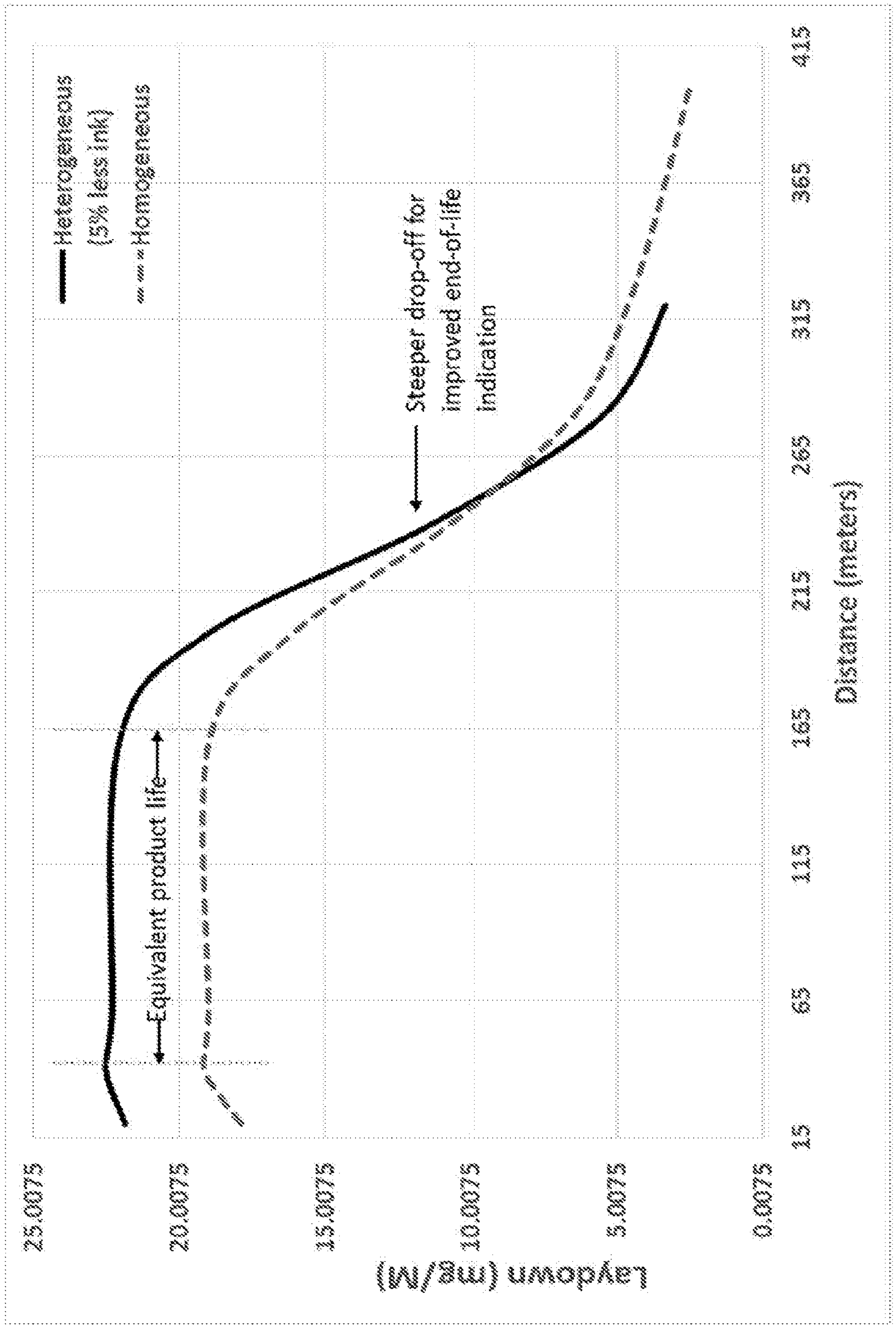
FIG. 6 is a graph comparing ink release profiles (with laydown in mg/meter as a function of meters) for (i) a traditional homogeneous ink reservoir at 6.0 grams ink loading; and (ii) a heterogeneous ink reservoir as described herein at 5.7 grams ink loading.

FIG. 6 is a representative graph of the results obtained, with the ink release profiles of the traditional homogeneous ink reservoir at 6.0 grams ink loading ("Homogeneous," shown in gray with a dashed line) and the heterogeneous ink reservoir at 5.7 grams ink loading ("Heterogeneous (5% less ink)," shown in black with a solid line) are shown with laydown in mg/meter as a function of meters. As FIG. 6 demonstrates, as compared to the traditional homogeneous ink reservoir, the heterogeneous ink reservoir demonstrated an equivalent product life and a steeper drop-off for improved end-of-life indication, all while having about 5% less ink.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 fibers refers to groups having 1, 2, or 3 fibers. Similarly, a group having 1-5 fibers refers to groups having 1, 2, 3, 4, or 5 fibers, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by 1/10 of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the claims include equivalents to the recited values, e.g., variations in the numerical quantity of such values that can occur, but would be recognized to be equivalents by a person skilled in the art.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A reservoir comprising:

a rod having:

a core component comprising a first single component fiber; and a surrounding component comprising a second single component fiber;

wherein the core component has a first capillary force, and wherein the surrounding component has a second capillary force;

wherein the first capillary force is greater than the second capillary force; and wherein the rod is configured to absorb and release a fluid by capillary action, and wherein the absorption and release of the fluid is configured to vary linearly along a cross-sectional diameter of the rod.

2. The reservoir of claim 1, wherein:

the fiber bulk density ranges from about 0.01 g/cm$^3$ to about 0.4 g/cm$^3$;

the fiber diameter ranges from about 0.5 μm to about 50 μm;

the fiber material is selected from the group consisting of polyester, nylon, acrylic, cellulose, polyethylene, polypropylene, polyvinyl alcohol, and combinations thereof;

the fiber surface tension ranges from about 30 dyn/cm to about 70 dyn/cm; and wherein the first capillary force and the second capillary force differ by a percentage selected from the group consisting of about 5%, about 10%, about 20%, about 50%, about 100%, and over 100%.

3. The reservoir of claim 1, wherein the first single component fiber and the second single component fiber-each have a form of a continuous fiber filament.

4. The reservoir of claim 1, wherein the rod has a first open end and a second open end, and wherein a shaft of the rod is encased in a fluid-impermeable material.

5. A reservoir comprising:

a rod having a core component and a surrounding component, each comprising a single component fiber;

wherein the rod has a cross-sectional diameter, and wherein at least one property of the rod varies linearly in value along the cross-sectional diameter; and wherein the at least one property comprises a capillary force.

6. The reservoir of claim 5, wherein the fiber bulk density ranges from about 0.01 g/cm$^3$ to about 0.4 g/cm$^3$.

7. The reservoir of claim 5, wherein the fiber diameter ranges from about 0.5 μm to about 50 μm.

8. The reservoir of claim 5, wherein the fiber material is selected from the group consisting of polyester, nylon, acrylic, cellulose, polyethylene, polypropylene, polyvinyl alcohol, and combinations thereof.

9. The reservoir of claim 5, wherein the fiber surface tension ranges from about 30 dyn/cm to about 70 dyn/cm.

10. The reservoir of claim 5, wherein the at least one property of the rod varies along the cross-sectional diameter by a percentage selected from the group consisting of about 5%, about 10%, about 20%, about 50%, about 100%, and over 100%.

11. The reservoir of claim 5, wherein the single component fiber has a form of a continuous fiber filament.

12. The reservoir of claim 5, wherein the fibers have a cross-sectional shape independently selected from the group consisting of a circle, a triangle, an ellipse, a peanut, a zig-zag, and combinations thereof.

13. The reservoir of claim 5, wherein the rod has a first open end and a second open end, and wherein a shaft of the rod is encased in a fluid-impermeable material.

14. The reservoir of claim 5, wherein the rod is configured to absorb and release a fluid by capillary action, and wherein the absorption and release of the fluid is configured to vary along the cross-sectional diameter of the rod.

15. The reservoir of claim 14, wherein the fluid is ink.

16. The reservoir of claim 5, wherein the reservoir is configured to be contained within a writing instrument.

17. A writing instrument comprising:

the reservoir of claim 5; and a nib;

wherein the reservoir is configured to hold and deliver an ink solution to the nib.

* * * * *